United States Patent
Conete

(10) Patent No.: US 8,205,453 B2
(45) Date of Patent: Jun. 26, 2012

(54) METHOD FOR ASSEMBLING END TO END TWO PARTS HAVING DIFFERENT THERMAL EXPANSION COEFFICIENTS AND ASSEMBLY THUS OBTAINED

(75) Inventor: Eric Conete, Merignac (FR)

(73) Assignee: Snecma Propulsion Solide, Le Haillan (FR)

( * ) Notice: Subject to any disclaimer, the term of this patent is extended or adjusted under 35 U.S.C. 154(b) by 281 days.

(21) Appl. No.: 12/531,516

(22) PCT Filed: Apr. 3, 2008

(86) PCT No.: PCT/FR2008/050600
§ 371 (c)(1),
(2), (4) Date: Sep. 16, 2009

(87) PCT Pub. No.: WO2008/139095
PCT Pub. Date: Nov. 20, 2008

(65) Prior Publication Data
US 2010/0102144 A1    Apr. 29, 2010

(30) Foreign Application Priority Data
Apr. 5, 2007 (FR) .................................. 07 54317

(51) Int. Cl.
*F02C 1/00*    (2006.01)
(52) U.S. Cl. .......................................................... 60/752
(58) Field of Classification Search ............ 60/752–760, 60/796–800
See application file for complete search history.

(56) References Cited

U.S. PATENT DOCUMENTS

| 2,494,659 | A | * | 1/1950 | Huyton | 285/41 |
| 3,990,231 | A | * | 11/1976 | Irwin | 60/800 |
| 4,413,477 | A | * | 11/1983 | Dean et al. | 60/757 |
| 5,327,727 | A | * | 7/1994 | Ward | 60/757 |
| 5,419,114 | A | * | 5/1995 | Bauermeister et al. | 60/800 |
| 7,647,779 | B2 | * | 1/2010 | Shi et al. | 60/800 |
| 2004/0032089 | A1 | * | 2/2004 | Conete et al. | 277/369 |
| 2005/0005608 | A1 | | 1/2005 | Pancou et al. | |
| 2006/0032237 | A1 | | 2/2006 | Aumont et al. | |
| 2007/0130958 | A1 | * | 6/2007 | Ohri et al. | 60/796 |
| 2007/0240423 | A1 | * | 10/2007 | Bulman et al. | 60/753 |

FOREIGN PATENT DOCUMENTS
EP    1152191    11/2001
* cited by examiner

*Primary Examiner* — Louis Casaregola
*Assistant Examiner* — Phutthiwat Wongwian
(74) *Attorney, Agent, or Firm* — Weingarten, Schurgin, Gagnebin & Lebovici LLP

(57) ABSTRACT

In order to assemble together two parts (154, 162) of materials having different coefficients of expansion via mutually engaged edge portions (154a, 162a), tongues (170) are formed in the thinned edge of one of the parts, the tongues being separated by slots (172) obtained by cutting or machining the material of the part, and the parts are assembled together by fastening (174) via the tongues. The edge portions are mutually engaged in such a manner as to be in substantially leaktight contact at the high temperatures encountered in operation. The method is applicable in particular to assembling together parts made respectively of metal and of ceramic composite material, in particular in an aviation gas turbine, for example, upstream and downstream secondary nozzles.

12 Claims, 3 Drawing Sheets

METHOD FOR ASSEMBLING END TO END TWO PARTS HAVING DIFFERENT THERMAL EXPANSION COEFFICIENTS AND ASSEMBLY THUS OBTAINED

BACKGROUND OF THE INVENTION

The present invention relates to end-to-end assembly of two parts that overlap via respective edge portions, the parts being made of materials having respective different coefficients of expansion.

A field of application of the invention lies in assembling together parts in subassemblies of gas turbines, in particular aviation gas turbines, and more particularly, but not exclusively, to two parts made respectively of a metal and of a ceramic matrix composite (CMC) material. Examples of such assemblies are an assembly constituted by an upstream secondary nozzle and a downstream secondary nozzle in an aeroengine, or an assembly formed by an end wall and an inner wall or an outer wall in a gas turbine combustion chamber.

In order to assemble together parts made of materials having significantly different coefficients of expansion, it is known to make use of connections that are flexible and capable of deforming elastically to absorb the differences between dimensional variations. Thus, it is known to use flexible connections for connecting CMC combustion chamber walls together with metal casings in a gas turbine. Reference can be made in particular to document US 2006/0032237.

FIG. 1 is a fragmentary and diagrammatic view showing the use of such connections for assembling a metal upstream secondary nozzle 1 with a CMC downstream secondary nozzle 2 at the outlet from a gas turbine aeroengine (where the terms "upstream" and "downstream" are used herein with reference to the flow direction of the gas stream through the engine).

The flexible connections are embodied by metal connection tabs 3 that are curved so as to be elastically deformable. At one end, each connection tab 3 is fastened, e.g. by bolting, to a flange 4 forming part of the upstream secondary nozzle 1, in the vicinity of its downstream end edge. At its other end, each tab 3 is fastened, e.g. by bolting, to the wall of the downstream secondary nozzle 2 in the vicinity of its upstream end edge. Since clearance is present between the adjacent annular edge portions of the nozzles 1 and 2, sealing is provided by a sealing device 5 such as a split metal gasket with petals that is fastened to the downstream end of the nozzle 1.

The use of connection tabs involves a certain amount of handling and adjustment during assembly. In addition, the presence of the connection tabs and of a flange, and the need for a sealing device give rise to an increase in weight and in production costs.

OBJECT AND SUMMARY OF THE INVENTION

An object of the invention is to provide an assembly method that makes it possible to avoid such drawbacks, and to this end the invention provides a method of assembling first and second parts together end to end via respective substantially annular edge portions, the parts being made of respective materials having different coefficients of thermal expansion, the method comprising the following steps:

conferring a thickness to an edge portion of the first part that is smaller than the thickness of the remainder of the part;

forming a succession of flexible tongues in the smaller-thickness edge portion of the first part, the tongues being separated from one another by slots obtained directly by cutting or machining;

engaging the edge portions of the two parts one in the other over a distance that is not less than the total length of the slots; and assembling the two parts together by means of fastener elements, each connecting a tongue of the edge portion of the first part to the edge portion of the second part;

the edge portions of the two parts being engaged one in the other in such a manner that the edge portions are substantially in mutual contact at the high temperatures normally encountered in operation.

Thus, the invention is remarkable in that the function of the flexible connections is incorporated directly in one of the parts, and in that the mutual engagement between the parts makes it possible directly to obtain a connection that is substantially leaktight at the high temperatures encountered in operation, thereby significantly simplifying assembly.

Another advantage of tongues is that they enable possible defects or irregularities of shape in the assembled-together edge portions to be compensated, in particular when said edge portions are annular and of relatively large diameter.

Advantageously, the tongues are formed in the edge portion of the part made of the material having the greater coefficient of expansion and presenting capacity for elastic deformation.

The first part may be made of metal and the second part is made of a ceramic matrix composite material.

In an implementation, the edge portion of the first part may be engaged on the edge portion of the second part without clearance and with prestress when cold.

In another implementation, which is preferred, the edge portion of the second part is engaged on the edge portion of the first part with clearance when cold. Under such circumstances, and preferably, the connection between a tongue of the edge portion of the first part and the edge portion of the second part is provided in such a manner as to press the tongue locally when cold against the edge portion of the second part by elastic deformation of the tongue.

The invention also provides an assembly of the kind that can be obtained by implementing the method, i.e. an assembly comprising first and second parts disposed end to end and connected together via respective substantially annular edge portions, the part being made of respective materials having different coefficients of thermal expansion, in which assembly:

the first part has an edge portion of thickness that is smaller than the thickness of the remainder of the first part and presenting a succession of flexible tongues that are separated by slots and that are formed integrally with the first part;

the edge portions of the parts being engaged one in the other over a distance that is not less than the total length of the slots; and fastener elements, each connecting a tongue of the edge portion of the first part to the edge portion of the second part;

the edge portions of the parts being engaged one in the other in such a manner that the edge portions are substantially in mutual contact at the high temperatures normally encountered in operation.

Such an assembly may constitute a wall structure for a gas turbine subassembly. In particular, the first and second parts may constitute respectively an upstream wall portion and a downstream wall portion of a secondary nozzle of a gas turbine aeroengine.

BRIEF DESCRIPTION OF THE DRAWINGS

The invention can be better understood on reading the following description given by way of non-limiting indication and with reference to the accompanying drawings, in which.

DETAILED DESCRIPTION OF IMPLEMENTATIONS

Figure 1:
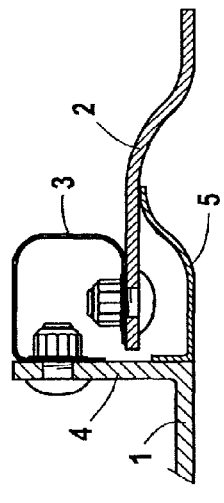
FIG. 1, described above, is a fragmentary section showing highly diagrammatically one known way of making an assembly via flexible connections.
Figure 2:
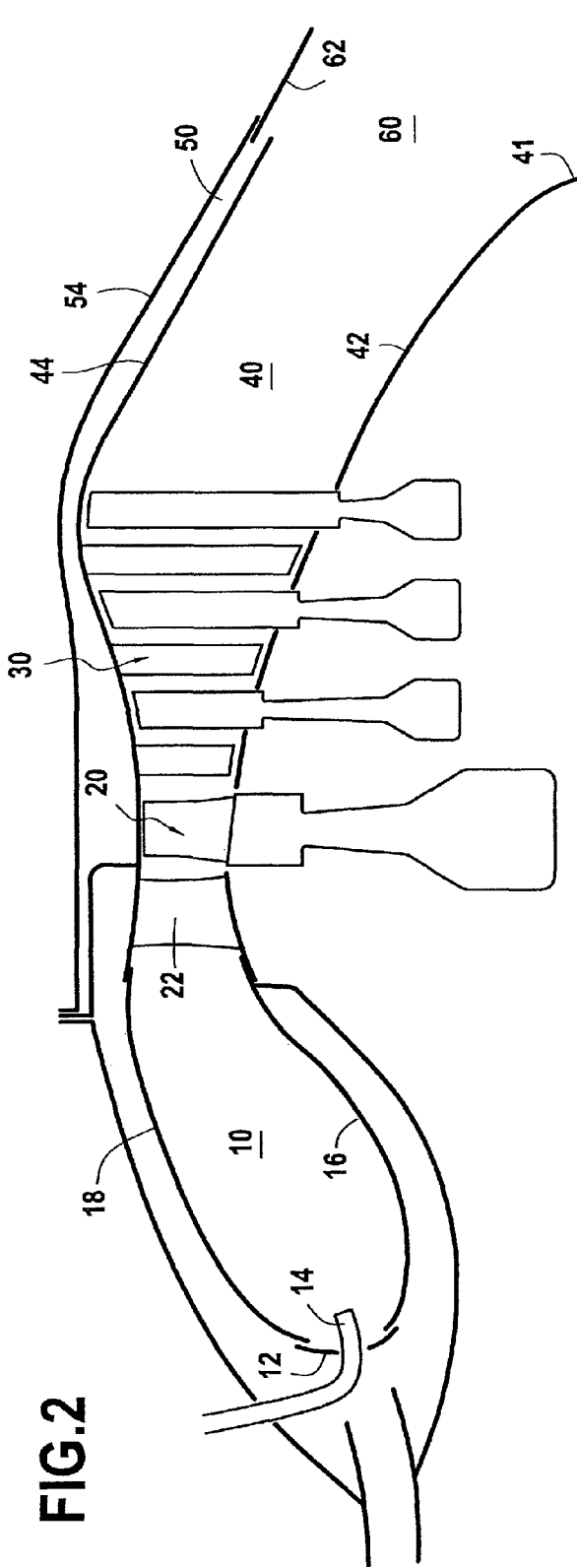
FIG. 2 is a highly diagrammatic axial half-section view of elements of a gas turbine aeroengine.

A particular field of application of the invention is that of gas turbines, in particular for aeroengines, such as, in particular, the engine shown in part and in highly diagrammatic manner in FIG. 2.

In the gas flow direction, FIG. 2 shows a combustion chamber 10, a high pressure (HP) turbine 20 having a turbine inlet nozzle 22 interposed between the chamber 10 and the HP turbine 20, a low pressure (LP) turbine 30, and a nozzle.

The combustion chamber has an end wall 12 in which injectors 14 are housed, and inner and outer walls 16 and 18 to which the end wall 12 is connected. At their downstream ends, the walls 16 and 18 are connected to inner and outer platforms of the nozzle.

The nozzle for channeling the stream downstream from the LP turbine comprises a primary nozzle 40 and a secondary nozzle, the secondary nozzle being constituted by an upstream portion or upstream secondary nozzle 50 and by a downstream portion or downstream secondary nozzle 60 that extends the primary nozzle 40 and the upstream secondary nozzle 50 in a downstream direction.

The primary nozzle 40 is of annular section and it is defined by an inner wall 42 and an outer wall 44. The inner wall 42 is terminated by an outlet cone or exhaust cone 41. The primary nozzle 40 channels the primary or "hot" stream from the LP turbine 30.

The upstream secondary nozzle 50 is defined by a rigid outer wall 54 that surrounds the wall 44 and that co-operates therewith to define an annular space in which there flows a secondary or "cold" stream coming from a fan (not shown) at the engine inlet, surrounding the combustion chamber and serving in particular as a cooling stream. Thus, the outer wall 44 of the primary nozzle is cooled by the air flowing in the upstream secondary nozzle. The outer wall 54 of the upstream secondary nozzle is connected at its downstream end portion to a rigid annular wall 62 defining the downstream secondary nozzle 60.

The outer wall 44 of the primary nozzle 40 is made of a refractory metal, e.g. of "Inconel", while the outer wall 54 of the upstream secondary nozzle 50 is typically made of titanium or titanium alloy.

The wall 62 of the downstream secondary nozzle 60 may advantageously be made of a ceramic matrix composite (CMC) material having high temperature performance that enables it to withstand the temperature of the hot gas stream at this position in the exhaust nozzle without suffering damage, and without needing its outside to be cooled actively. It should be observed that the "cold" air escaping from the space between the walls 44 and 54 may contribute to forming a protective film of cool air over the upstream portion of the inside surface of the wall 62.

The use of a CMC composite material for the downstream secondary nozzle 60 thus serves to limit the overall requirements for cooling air and enables the downstream secondary nozzle to be simple in structure, while nevertheless significantly reducing weight compared with a metal.

CMC materials are remarkable for their thermostructural properties and their ability to conserve these properties at high temperatures. They are constituted by fiber reinforcement made of refractory fibers (carbon or ceramic), which reinforcement is densified by a ceramic matrix, in particular of carbide, nitride, refractory oxide, . . . . Typical examples of CMC materials are C—SiC materials (carbon fiber reinforcement and silicon carbide matrix), SiC—SiC materials, and C—C/SiC materials (matrix comprising both carbon and silicon carbide). It is well known how to fabricate CMC composite parts. The fiber reinforcement may be densified by a liquid technique (impregnation with a resin that is a precursor for the ceramic matrix and transformation of the resin into ceramic by curing and by pyrolysis, which process may be repeated), or by a gas technique (chemical vapor infiltration).

Since CMC materials have a coefficient of expansion that is different from that of metals, generally considerably smaller, it is necessary for the connection between the walls 54 and 62 to present sufficient flexibility to compensate for the differences in dimensional variations of thermal origin between the interconnected parts, without damaging the parts or the connection, and while providing a connection that is substantially leaktight between the upstream and downstream portions of the secondary nozzle.

Figure 3:
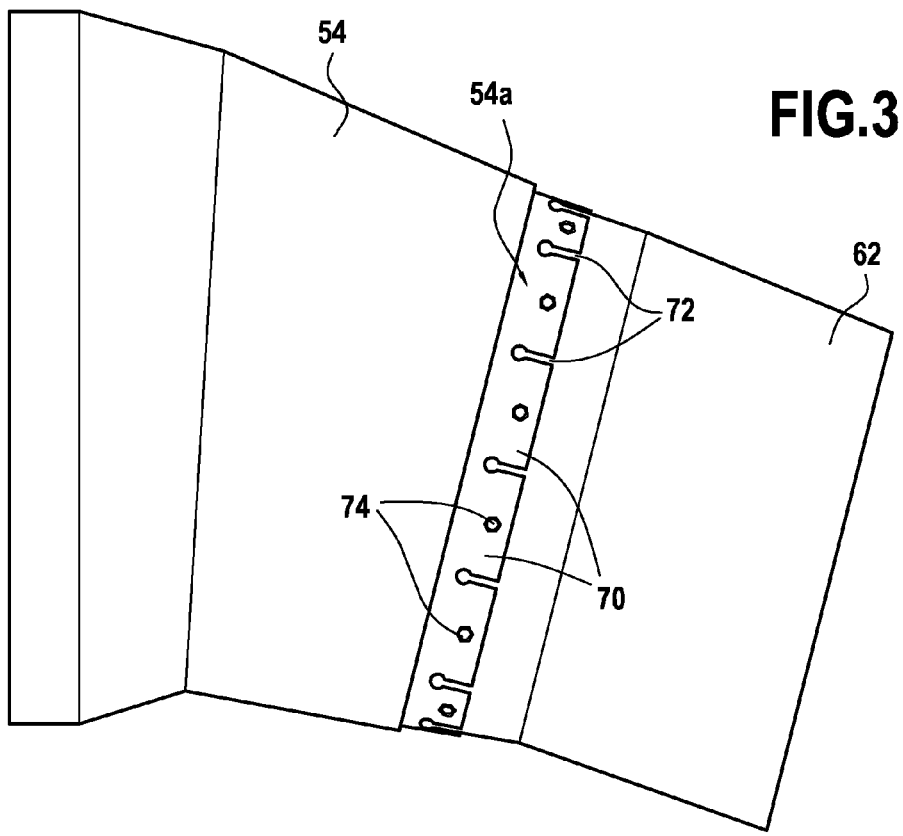
FIG. 3 is a diagrammatic view of a secondary nozzle of a gas turbine aeroengine with upstream and downstream portions assembled together in accordance with an implementation of the invention.
Figure 4:
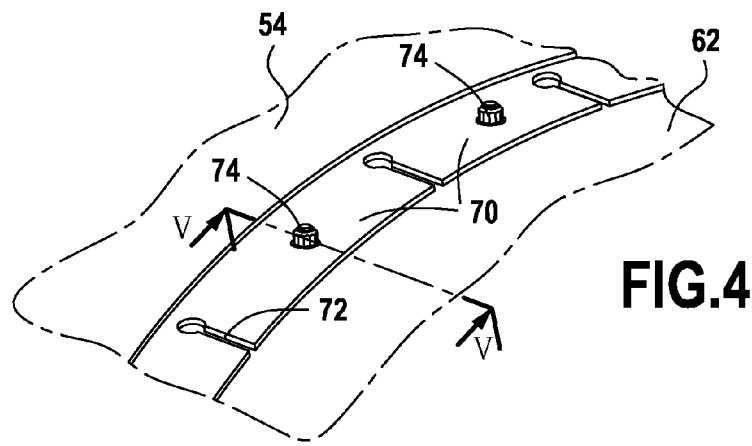
FIG. 4 is a larger-scale view showing a detail of FIG. 3.
Figure 5:
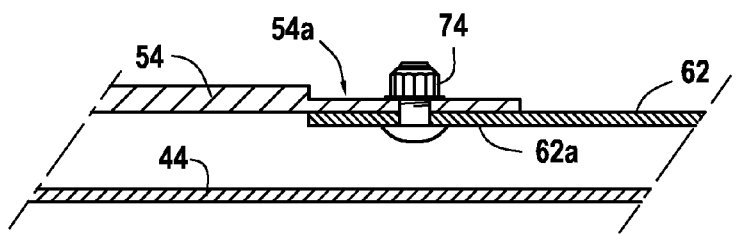
FIG. 5 is a section view on plane V-V of FIG. 4.

In the embodiment of FIGS. 3 to 5, the downstream annular edge portion 54a of the upstream secondary nozzle wall 54 and the upstream annular edge portion 62a of the downstream secondary nozzle wall 62 are mutually engaged, the edge portion 54a surrounding the edge portion 62a.

The edge portion 54a is thinner than the remainder of the wall 54 that conserves a structural function, and tongues 70 are formed in the edge portion 54a, the tongues being separated by slots 72. The tongues are obtained directly by cutting or machining the slots 72 in the metal of the wall 54. The tongues 70 and the slots 72 extend substantially axially from the downstream end of the edge portion 54a, the slots terminating in rounded recesses in order to avoid concentrating stresses at the ends of the slots.

The walls 54 and 62 are assembled together by bolting, the heads of the bolts 74 bearing against the inside face of the wall 62. Bolt fastening is performed with each tongue 70 through a central portion thereof, or at least with some of the tongues. It is also possible to envisage fastening by means of rivets.

In the embodiment of FIGS. 3 to 5, the annular edge portions 62a and 54a are engaged one in the other without clearance and with prestress when cold so that mutual contact is maintained at the high temperatures normally encountered in operation. Assembly with prestress can be implemented in well-known manner by heating the metal wall 54 prior to engaging the edge portion 54a over the edge portion 62a. By ensuring that the annular edge portion 62a is engaged in the annular edge portion 54a over a distance that is not less than the length of the slots 72, sealing is substantially ensured in operation at the connection between the upstream and downstream secondary nozzles.

The smaller thickness for the edge portion 54a is selected so as to obtain tongues 70 that are flexible with an elastic deformation range sufficient to enable assembly to be provided with prestress and to enable the differential expansion between the assembled-together parts to be "tracked", in combination with the slots 72. The tongues 70 also serve to compensate for defects or irregularities in shape between the assembled-together edge portions. Since the capacity for elastic deformation of metals is generally greater than that of CMC materials, it is preferable for the tongues to be formed in the metal. Nevertheless, forming tongues in the CMC material part is not excluded insofar as that materials presents sufficient capacity for elastic deformation.

Figure 6:
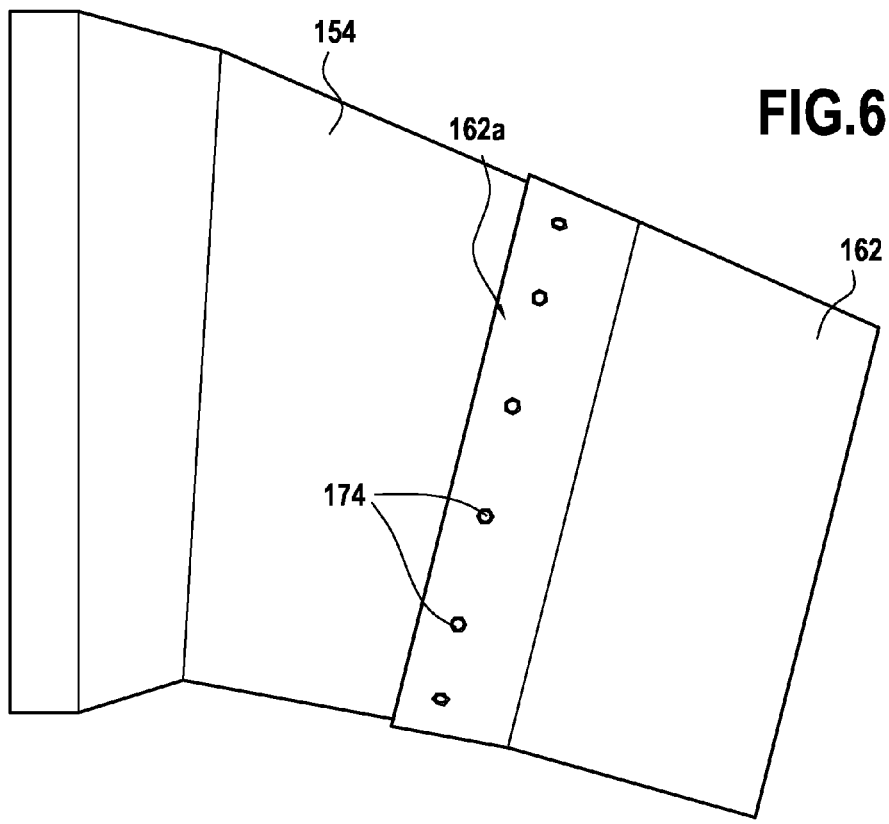
FIG. 6 is a diagrammatic view of a secondary nozzle of a gas turbine aeroengine with upstream and downstream portions assembled together in accordance with another implementation of the invention.
Figure 7:
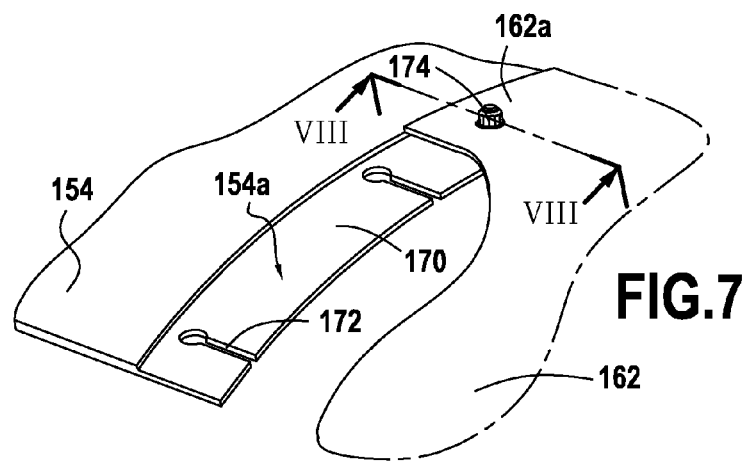
FIG. 7 is a larger-scale view of a detail of FIG. 6.
Figure 8:
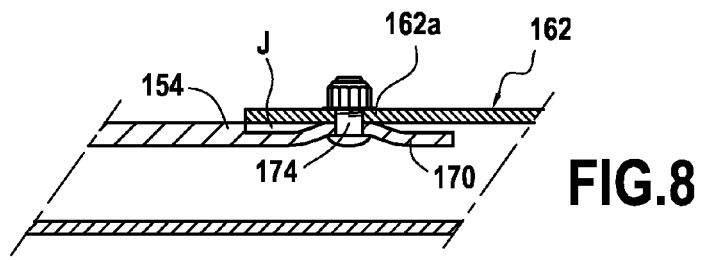
FIG. 8 is a section view on plane VIII-VIII of FIG. 7.

In the preferred embodiment of FIGS. 6 to 8, the downstream annular edge portion 154a of the upstream secondary nozzle wall 154 and the upstream annular edge portion 162a of the downstream secondary nozzle 162 are engaged mutually, with the edge portion 162a surrounding the edge portion 154a.

As in the embodiment of FIGS. 3 to 5, the edge portion 154a is of thickness that is smaller than the thickness of the remainder of the wall 154 and tongues 170 are formed in the edge portion 154a. The tongues 170 are obtained directly by cutting or machining slots 172 in the metal of the wall 154. The tongues 170 and the slots 172 extend substantially in an axial direction from the downstream end of the edge portion 154a. The smaller thickness of the edge portion 154a enables flexible tongues 170 to be formed that present good capacity for elastic deformation.

The annular edge portions 154a and 162a are engaged one in the other with clearance J when cold (FIG. 8). The clearance J is selected so that, at the high temperatures normally encountered in operation, the edge portion 154a presses against the edge portion 162a, possibly with a small amount of stress. In the intended application, the clearance J is typically a few tenths of a millimeter. By ensuring that the edge portion 162a is engaged on the edge portion 154a over a distance that is at least as long as the slots 172, sealing is then substantially ensured in operation at the connection between the upstream and downstream secondary nozzles. The presence of the clearance J and of the slots 172 makes it possible to compensate the differences in dimensional variations of thermal origin.

The walls 154 and 162 are assembled together by bolting, the heads of the bolts 174 bearing against the inside face of the wall 154. Bolt fastening is implemented with each tongue 170 in a central portion thereof, or at least with some of the tongues. Fastening by riveting could also be envisaged. As shown in FIG. 8, the bolted connection is tightened sufficiently to cause the tongue 170 to press locally against the inside face of the edge portion 162a, given the capacity of the tongues 170 to deform elastically. Thus, there is no need to tighten the bolts when hot, the bolts advantageously being associated with self-locking nuts.

It should be observed that the capacity for elastic deformation also serves to compensate for defects or irregularities of shape between the assembled-together edge portions.

The technique described for assembling together the upstream and downstream secondary nozzles may be applied for assembling together other parts in a gas turbine engine, as shown in FIG. 2.

For example, such an assembly may be used between the chamber end wall 12 that is made of metal one and/or the other of the inner and outer chamber walls 16 and 18 that are made of CMC material.

The invention claimed is:

1. A method of assembling a first part and a second part in a subassembly of a gas turbine, the first and second parts being assembled together end to end via respective substantially annular edge portions, the first and second parts being made of respective materials having different coefficients of thermal expansion, the first part being made of the material having the greater coefficient of thermal expansion and presenting capacity for elastic deformation, the method comprising the following steps:
    conferring a thickness to an edge portion of the first part that is smaller than the thickness of the remainder of the first part;
    forming a succession of flexible tongues in the smaller-thickness edge portion of the first part, the tongues being separated from one another by slots obtained directly by cutting or machining;
    engaging the edge portions of the first and second parts one in the other over a distance that is not less than a total length of the slots; and
    assembling the first and second parts together by means of fastener elements, each connecting a tongue of the edge portion of the first part to the edge portion of the second part;
    the edge portions of the first and second parts being engaged one in the other in such a manner that the edge portions are substantially in mutual contact at the high temperatures normally encountered in operation of the gas turbine.

2. A method according to claim 1, wherein the first part is made of metal and the second part is made of a ceramic matrix composite material.

3. A method according to claim 1, wherein the edge portion of the first part is engaged on the edge portion of the second part without clearance and with prestress when not exposed to the high temperatures normally encountered in operation of the gas turbine.

4. A method according to claim 1, wherein the edge portion of the second part is engaged on the edge portion of the first part with clearance when not exposed to the high temperatures normally encountered in operation of the gas turbine.

5. A method according to claim 4, wherein the connection between a tongue of the edge portion of the first part and the edge portion of the second part is provided in such a manner as to press the tongue locally against the edge portion of the second part by elastic deformation of the tongue when not exposed to the high temperatures normally encountered in operation of the gas turbine.

6. An assembly comprising a first part and a second part disposed end to end and connected together via respective substantially annular edge portions, the first and second parts being made of respective materials having different coefficients of thermal expansion, the first part being made of the material having the greater coefficient of thermal expansion and presenting capacity for elastic deformation, in which assembly:
    the first part has an edge portion of thickness that is smaller than the thickness of the remainder of the first part and presenting a succession of flexible tongues that are separated by slots and that are formed integrally with the first part;

the edge portions of the first and second parts being engaged one in the other over a distance that is not less than a total length of the slots; and fastener elements being provided, each connecting a tongue of the edge portion of the first part to the edge portion of the second part;

the edge portions of the first and second parts being engaged one in the other in such a manner that the edge portions are substantially in mutual contact at the high temperatures normally encountered in operation of a gas turbine.

7. An assembly according to claim 6, wherein the first part is made of metal and the second part is made of a ceramic matrix composite material.

8. An assembly according to claim 6, wherein the edge portion of the first part is engaged on the edge portion of the second part without clearance and with prestress when not exposed to the high temperatures normally encountered in operation of the gas turbine.

9. An assembly according to claim 6, wherein the edge portion of the second part is engaged on the edge portion of the first part with clearance when not exposed to the high temperatures normally encountered in operation of the gas turbine.

10. An assembly according to claim 9, wherein each fastener element connects a tongue to the edge portion of the second part with the tongue being pressed locally against the edge portion of the second part.

11. An assembly according to claim 6, wherein the first part and the second part constitutes a wall structure of a subassembly of a gas turbine.

12. An assembly according to claim 6, wherein the first part and the second part respectively constitute an upstream wall portion and a downstream wall portion of a secondary nozzle of a gas turbine aeroengine.

* * * * *